United States Patent Office 2,977,376
Patented Mar. 28, 1961

2,977,376

1-AMINO-2-NITROBENZENE-4-SULFONIC ACID AMIDES

Ernst Merian, Allschwil, Switzerland, assignor to Sandoz Ltd., Basel, Switzerland No Drawing. Filed Oct. 24, 1958, Ser. No. 769,283
Claims priority, application Switzerland Feb. 22, 1954

8 Claims. (Cl. 260—397.7)

Only a few disperse dyestuffs are known which dye acetate rayon in yellow shades having sufficient fastness to withstand washing at elevated temperatures without undergoing change of shade or bleeding on adjacent material. The affinity of these dyestuffs for acetate rayon, however, is insufficient.

The present invention relates to disperse dyestuffs which have good affinity for acetate rayon. They dye this fiber in yellow shades of very good fastness to washing and excellent fastness to light and to gas fumes. The dyestuffs are water-insoluble derivatives of 1-amino-2-nitrobenzene-4-sulfonic acid amide and correspond to the formula

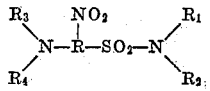

wherein

R stands for a mononuclear radical of the benzene series,
$R_1$ stands for a radical of the aliphatic, cycloaliphatic or araliphatic series which may be further substituted or for a radical of the benzene or naphthalene series,
$R_2$ stands for hydrogen or a radical of the aliphatic series which may be further substituted, or stands—together with N and $R_1$—for the radical of a saturated heterocyclic amine,
$R_3$ stands for a radical of the aliphatic, cycloaliphatic or araliphatic series which is different from $R_1$ and may be further substituted, or a radical of the benzene series carrying at least one aliphatic ether group adjacent to the benzene nucleus or linked to it by an oxygen atom and which may contain hydroxyl groups, or stands—when $R_1$ represents a radical of the cycloaliphatic, araliphatic or aromatic series—also for a radical of the benzene series containing at least one hydroxyalkyl group adjacent to the benzene nucleus or linked to it by an oxygen atom,
$R_4$ stands for hydrogen or a radical of the aliphatic series which may be further substituted, and wherein at least one of the symbols
$R_1$ and $R_3$ represents or contains a cyclic radical, and the group $NO_2$ is in ortho-position to the N of the

residue.

The aforesaid derivatives of 1-amino-2-nitrobenzene-4-sulfonic acid amide are obtained by reacting 1 mol of a 1-halogen-2-nitrobenzene-4-sulfonic acid amide which corresponds to the formula

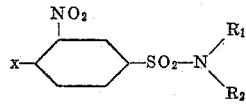

wherein $x$ stands for chlorine or bromine, and $R_1$ and $R_2$ have the previously-recited significances, with 1 mol of an amine which corresponds to the formula

wherein $R_3$ and $R_4$ have the previously-recited significances.

Valuable dyestuffs are also obtained when 1 mol of a 1-halogen-2-nitrobenzene-4-sulfonic acid amide of the Formula I is reacted with 1 mol of a mixture in any desired proportions of two or more different amines of the Formula II, or 1 mol of a mixture in any desired proportions of two or more different 1-halogen-2-nitrobenzene-4-sulfonic acid amides of the Formula I with 1 mol of an amine of the Formula II, or 1 mol of a mixture in any desired proportions of two or more different 1-halogen-2-nitrobenzene-4-sulfonic acid amides of the Formula I with 1 mol of a mixture in any desired proportions of two or more different amines of the Formula II.

Finally it is possible to replace the mixtures of two or more different amines of the Formula II by mixtures in any desired proportions of one or more amines of the Formula II plus a mono- or bi-nuclear cycloaliphatic or aromatic amine which differs from the amines of Formula II and contains no water-solubilizing groups.

The reaction of the 1-halogen-2-nitrobenzene-4-sulfonic acid amides of the Formula I with the amines of the Formula II or mixtures of amines is best conducted at elevated temperature. Water is an excellent reaction medium; a wetting agent may be added, or alternatively an organic solvent, e.g. ethanol, benzyl alcohol, benzene, toluene, etc. An addition of a suitable acid-binding agent such as sodium acetate, sodium carbonate or sodium bicarbonate has a favorable influence on condensation in most cases. The same effect is achieved with an excess of the appropriate amine or amines.

The 1-halogen-2-nitrobenzene-4-sulfonic acid amides used as starting materials for performing this invention can be produced by the recognized methods, i.e. by treating 1-halogen-2-nitrobenzene-4-sulfonic acid halides with aliphatic, cycloaliphatic, araliphatic, heterocyclic and aromatic amines under mild conditions. The resulting amides, some of which are new, can be characterized by their melting points:

| 1-chloro-2-nitrobenzene-4-sulfonic acid- | Melting point, °C. |
|---|---|
| -methylamide | 63 |
| -ethylamide | 94 |
| -isopropylamide | 79 |
| -n-hexylamide | 73 |
| -(2'-ethyl)-hexylamide | 38 |
| -(2'-hydroxy)-ethylamide | 126 |
| -(3'-methoxy)-propylamide | 63 |
| -benzylamide | 105 |
| -cyclohexylamide | 86 |
| -phenylamide | 85 |
| -(2'-methyl)-phenylamide | 145 |
| -(3'-methyl)-phenylamide | 84 |
| -(4'-methyl)-phenylamide | 126 |
| -(4'-methoxy)-phenylamide | 156 |
| -[4'-[2''-(2'''-methoxy)-ethoxy]-ethoxy]-phenylamide | 98 |
| -(2',5'-dichloro)-phenylamide | 155 |
| -naphthyl(1')-amide | 169 |
| -(5',6',7',8'-tetrahydro)-naphthyl(1')-amide | 164 |
| -morpholide | 156 |
| -dimethylamide | 106 |
| -di-(2'-hydroxyethyl)-amide | 105 |
| -N-phenyl-N-(2'-hydroxy)-ethylamide | 106 |
| -N-(2'-methyl)-phenyl-N-(2'-hydroxy)-ethylamide | 119 |
| -N-(3'-methyl)-phenyl-N-(2'-hydroxy)-ethylamide | 100 |
| -(2'-hydroxy)-propylamide | 102 |
| -di-(2'-hydroxypropyl)-amide | 152 |
| -N-methyl-N-(2'-hydroxy)-ethylamide | 107 |

This table merely illustrates the type of the 1-halogen-2-nitrobenzene-4-sulfonic acid amides which may be used, and is not intended to be exhaustive.

As examples of amines of the Formula II suitable for carrying out the reaction with 1-halogen-2-nitrobenzene-4-sulfonic acid amides according to the present invention, the following may be enumerated:

aminomethane,
aminoethane,
aminopropane,
aminoisopropane,
aminobutane,
aminopentane,
aminohexane,
aminooctane,
aminodecane,
1-amino-2-hydroxyethane,
1-amino-2-hydroxypropane,
1-amino-3-hydroxypropane,
1-amino-2,3-dihydroxypropane,
aminohydroxybutane,
aminohydroxypentane,
1-amino-2-methoxyethane,
1-amino-2-methoxypropane,
1-amino-3-methoxypropane,
1-amino-2-hydroxy-3-methoxypropane,
1-amino-2-morpholylethane,
1-amino-3-morpholylpropane,
benzylamine,
1-amino-2-phenylethane,
aminocyclohexane,
amino-methylcyclohexane,
amino-dimethylcyclohexane,
1-amino-1,2,3,4-tetrahydronaphthalene,
2-amino-1,2,3,4-tetrahydronaphthalene,
1-amino-2- or -3- or -4-(2'-methoxy or -ethoxy or -propoxy or -butoxy)-ethoxybenzene,
1-amino-2- or -3- or -4-[2'-(2''-hydroxy)-ethoxy]-ethoxybenzene,
1-amino-2- or -3- or -4-[2'-(2''-methoxy or -ethoxy or -propoxy or -butoxy)-ethoxy]-ethoxybenzene,
1-amino-2- or -3- or -4-{2'[2''-(2'''-hydroxy)-ethoxy]-ethoxy}-ethoxybenzene,
1-amino-2- or -3- or -4-[2'- or 3'-(2''- or 3''-hydroxy)-propoxy]-propoxybenzene,
1-amino-2- or -3- or -4-methoxymethyl- or -ethoxymethyl-benzene,
1-amino-2- or -3- or -4-(2'-methoxy or -ethoxyl)-ethoxymethylbenzene,
1-amino-2- or -3- or -4-[2'-(2''-hydroxy)-ethoxy]-ethoxymethylbenzene,
1-amino-3-(2'-hydroxy)-ethoxymethyl-4-methylbenzene,
1-amino-3-(2'-methoxy or -ethoxy)-ethoxymethyl-4-methylbenzene,
1-amino-3,5-di-[(2'-hydroxy)-ethoxymethyl]-4-methylbenzene,
1-amino-3,5-di-[(2'-methoxy or -ethoxy)-ethoxymethyl]-4-methylbenzene,
2-(3'-amino)-phenyldioxolane,
amino-saligenin-methylene ether,
x-amino-1-[2'-(2''-hydroxy)-ethoxy]-ethoxylnaphthalene,
1-amino-2- or -3- or -4-hydroxymethylbenzene,
1-amino-2- or -3- or -4-(2'-hydroxy)-ethylbenzene,
1-amino-2- or -3- or -4-(2'- or 3'-hydroxy)-propylbenzene,
1-amino-2- or -3- or -4-(2',3'-dihydroxy)-propylbenzene,
1-amino-2- or -3-hydroxymethyl-4-methylbenzene,
1-amino-2-methoxy-5-(2'- or 3'-hydroxy)-propylbenzene,
1-amino-2-chloro-3- or 5-(2'- or 3'-hydroxy)-propylbenzene,
1-amino-2-chloro-5-(2'-hydroxy)-ethylbenzene,
1-amino-2-methyl-5-(2'-hydroxy)-ethylbenzene,
1-amino-2-hydroxy-5-(2'-hydroxy)-ethylbenzene,
1-amino-2- or -3- or -4-(2'-hydroxy)-ethoxybenzene,
1-amino-2- or -3- or -4-(2'- or 3'-hydroxy)-propoxybenzene,
1-amino-2- or -3- or -4-(2'.3'-dihydroxy)propoxybenzene,
1-amino-2- or -3- or -4-(4'-hydroxy)-butoxybenzene,
1-amino-3-chloro-4- or -6-(2'-hydroxy)ethoxybenzene,
1-amino-3-chloro-4-(2'- or 3'-hydroxy)- or -(2'.3'-dihydroxy)-propoxybenzene,
1-amino-3-bromo-4- or -6-(2'-hydroxy)-ethoxybenzene.

A preferred sub-group of dyestuffs according to the present invention are the 1-amino-2-nitrobenzene-4-sulfonic acid amides which correspond to the formula

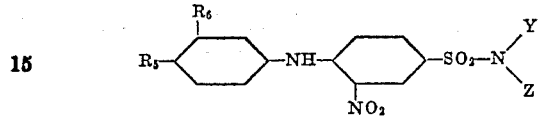

wherein Y stands for a member selected from the group consisting of phenyl, methylphenyl, naphthyl, tetrahydronaphthyl, cyclohexyl and benzyl, Z stands for a member selected from the group consisting of hydrogen and lower hydroxyalkyl, $R_5$ stands for a member selected from the group consisting of lower hydroxyalkyl, lower hydroxyalkoxyalkoxy, lower alkoxyalkoxy and, when $y$ is different from phenyl, lower hydroxyalkoxy and lower alkoxyalkoxyalkoxy and, when $R_6$ is a substituent containing at least one oxygen atom, also hydrogen and methyl, $R_6$ stands for a member selected from the group consisting of hydrogen, chlorine, lower hydroxyalkyl, lower hydroxyalkoxyalkyl, lower alkoxyalkoxyalkyl and lower alkoxyalkoxyalkoxyalkyl.

The following examples illustrate the invention without in any way limiting its scope. The proportions refer to parts by weight; temperatures are in degrees centigrade.

*Example 1*

36.4 parts of 1-chloro-2-nitrobenzene-4-sulfonic acid phenylamide are heated in 100 parts of ethanol to boiling point. 20 parts of aminocyclohexane are then added dropwise to the solution. After 1½ hours the hot mass is filtered to remove small quantities of impurities. Upon cooling, the 1-cyclohexylamino-2-nitrobenzene-4-sulfonic acid phenylamide of the formula

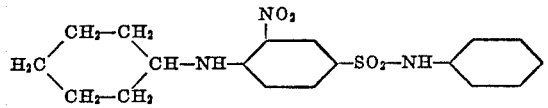

crystallizes out from the intensely yellow solution. It melts at 142°. When this compound is processed in the usual way to give a dye preparation, e.g. by grinding with a dispersing agent and with sodium sulfate, a powder is obtained which dyes acetate rayon from aqueous dispersion at elevated temperatures in bright greenish yellow shades having outstanding fastness properties. Such dyeings are notable for their exceptionally good fastness to washing. This dyestuff also dyes synthetic polyester fibers of the nylon and polyester fibers of the Dacron type in greenish yellow shades possessing very good fastness properties.

The new dyestuff is distinctly superior to 1-cyclohexylamino-2-nitrobenzene-4-sulfonic acid cyclohexylamide in its affinity for acetate rayon and also to 1-cyclohexylamino-2-nitrobenzene-4-sulfonic acid amide in its washing fastness on acetate rayon.

*Example 2*

16 parts of 1-chloro-2-nitrobenzene-4-sulfonic acid di-(2'-hydroxyethyl)-amide are heated together with 5 parts of aminocyclohexane and 40 parts of water to boiling point. The hydrochloric acid thus liberated is neutralized by an addition of 4.2 parts of sodium bicarbonate. After 2 hours the product is cooled, the mother-liquors decanted, and the resin-like residue washed with water.

The dyestuff solidifies rapidly. It corresponds to the formula

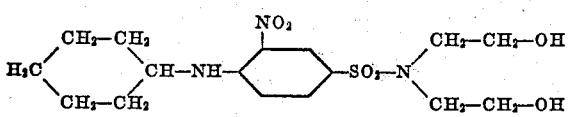

When crystallized from an ethanol solution, it has a melting point of 115°. It dyes acetate rayon in greenish yellow shades which are fast to washing.

A similar dyestuff is obtained when 1-bromo-2-nitrobenzene-4-sulfonic acid N-ethyl-N-(2'-hydroxy)-ethylamide is condensed in an analogous manner with aminocyclohexane. It corresponds to the formula

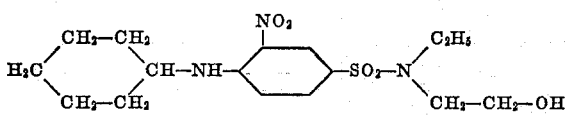

The dyestuff produced by the reaction of 1-chloro-2-nitrobenzene-4-sulfonic acid di-(2'-methoxyethyl)-amide with aminocyclohexane also dyes acetate rayon is greenish yellow shades which are fast to washing. It corresponds to the formula

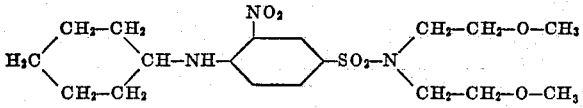

In a similar way the following greenish yellow dispersion dyestuffs may be obtained from the corresponding 1-chloro-2-nitrobenzene-4-sulfonic acid amides: 1-cyclohexylamino-2-nitrobenzene-4-sulfonic acid N-methyl-N-(2'-hydroxy)-propylamide, 1-cyclohexylamino-2-nitrobenzene-4-sulfonic acid N-methyl-N-(2'-hydroxy)-butylamide, 1-cyclohexylamino-2-nitrobenzene-4-sulfonic acid N-ethyl-N-(2'-hydroxy)-propylamide, 1-cyclohexylamino-2-nitrobenzene-4-sulfonic acid N-ethyl-N-(2'-hydroxy)-butylamide, 1-cyclohexylamino-2-nitrobenzene-4-sulfonic acid N,N-di-(2'-hydroxybutyl)-amide, 1-cyclohexylamino-2-nitrobenzene-4-sulfonic acid N-(2'-methoxy)-ethylamide, 1-cyclohexylamino-2-nitrobenzene-4-sulfonic acid N-(2'-ethoxy)-ethylamide, 1-cyclohexylamino-2-nitrobenzene-4-sulfonic acid N-methyl-N-(2'-methoxy)-ethylamide, 1-cyclohexylamino-2-nitrobenzene-4-sulfonic acid N-ethyl-N-(2'-methoxy)-ethylamide, 1-cyclohexylamino-2-nitrobenzene-4-sulfonic acid N,N-di-(2'-ethoxyethyl)-amide, 1-cyclohexylamino-2-nitrobenzene-4-sulfonic acid N,N-di-(2'-methoxypropyl)-amide, 1-cyclohexylamino-2-nitrobenzene-4-sulfonic acid N-phenyl-N-(2'-methoxy)-ethylamide, 1-cyclohexylamino-2-nitrobenzene-4-sulfonic acid N-phenyl-N-(2'-hydroxy)-propylamide and 1-cyclohexylamino-2-nitrobenzene-4-sulfonic acid N-phenyl-N-(3'-methoxy)-propylamide.

*Example 3*

21.5 parts of 1-amino-4-[2'-(2''-methoxy)-ethoxy]-ethoxybenzene, 31.2 parts of 1-chloro-2-nitrobenzene-4-sulfonic acid phenylamide and 8.4 parts of sodium bicarbonate are stirred into 40 parts of water. The emulsion thus obtained is heated to boiling point and stirred for 2 hours at this temperature. Upon cooling the product separates from the mass; it is then filtered and washed, first with water and then with a little ethanol. The new yellow dyestuff may be crystallized from four times its weight of ethanol, from which it separates in needles having a melting point of 114°. It corresponds to the formula

When converted into a dye preparation in the normal manner, it dyes acetate rayon and synthetic polyamide fibers from aqueous dispersion in reddish yellow shades which are fast to light and subliming. Dyeings on acetate rayon are specially noteworthy for their outstanding fastness to washing. Thus they withstand treatment in an aqueous solution containing 0.5% soap and 0.2% soda for 45 minutes at 71° (Wash Test No. 3, 1953 Technical Manual and Year Book of the American Association of Textile Chemists and Colorists, pages 91–92) without undergoing change of shade or bleeding onto adjacent acetate and viscose rayon.

A similar dyestuff is obtained by reacting, in analogous manner, 1-chloro-2-nitrobenzene-4-sulfonic acid phenylamide with 1-amino-4-(2',2'-diethoxy)-ethoxybenzene. It corresponds to the formula

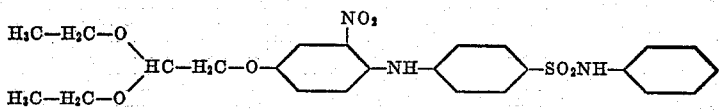

*Example 4*

10.4 parts of 1-chloro-2-nitrozenzene-4-sulfonic acid phenylamide and 6 parts of 1-amino-4-(2'-hydroxy)-ethoxybenzene are stirred into 50 parts of water. The suspension is heated to boiling point, 3 parts of sodium bicarbonate added in portions, and the whole stirred for 4 hours at 90–100°. The dyestuff gradually separates out in solid form and after cooling the mass is removed by filtration. After washing and drying, a yellow-brown powder is obtained which can be crystallized to form orange colored needles having a melting point of 140°. It corresponds to the formula

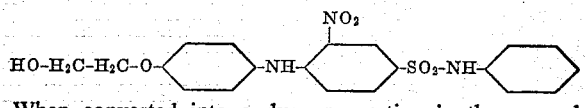

When converted into a dye preparation in the normal way, the new dyestuff dyes acetate from aqueous dispersion in reddish yellow shades which are fast to light and subliming. The dyeings are characterized by very good fastness to washing.

A similar dyestuff can be produced by condensing 1-chloro-2-nitrobenzene-4-sulfonic acid phenylamide with 1-amino-[2'-(2''-hydroxy)-ethoxy]-ethoxybenzene. It corresponds to the formula

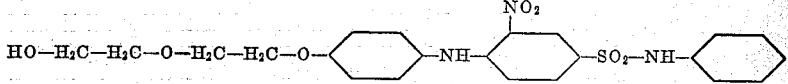

In a similar way the following slightly less reddish dispersion dyestuffs may be obtained from 1-chloro-2-nitrobenzene-4-sulfonic acid phenylamide: 1-(4'-hydroxymethyl)-phenylamino-2-nitrobenzene-4-sulfonic acid phenylamide, 1-[4'-(1''-hydroxy)-ethyl]-phenylamino-2-nitrobenzene-4-sulfonic acid phenylamide, 1-[3'-(1''-hydroxy)-ethyl]-phenylamino-2-nitrobenzene-4-sulfonic acid phenylamide, 1-(3'-hydroxymethyl-4'-methyl)-phenylamino-2-nitrobenzene-4-sulfonic acid phenylamide, 1-[3'-(1''-hydroxy)-ethyl-4'-methyl]-phenylamino-2-nitrobenzene-4-sulfonic acid phenylamide, 1-[3'-(2''-methoxy)-ethoxymethyl-4'-methyl]-phenylamino-2-nitrobenzene- 4-sulfonic acid phenylamide, 1-[3'-(2''-hydroxy)-ethyl-2'-methyl]-phenylamino-2-nitrobenzene-4-sulfonic acid phenylamide, 1-(3'-hydroxymethyl-4'-chloro)-phenylamino-2-nitrobenzene-4-sulfonic acid phenylamide, 1-[3'-(2''-hydroxy)-ethoxymethyl-4'-chloro]-phenylamino-2-nitrobenzene-4-sulfonic acid phenylamide, 1-{3'-[2''-2'''-methoxy)-ethoxy]-ethoxymethyl-4'-methyl}-phenylamino-2-nitrobenzene-4-sulfonic acid phenylamide, 1-[4'-(3''-hydroxy)-propyl]-phenylamino-2-nitrobenzene-4-sulfonic acid phenylamide and 1-[4'-(1''-hydroxy-1'',1'''-dimethyl)-methyl]-phenylamino-2-nitrobenzene-4-sulfonic acid phenylamide.

In the following tables the production of further valuable disperse dyestuffs is described. They are obtained as defined in the above four examples, namely by reacting 1 mol of a 1-halogen-2-nitrobenzene-4-sulfonic acid amide of the formula

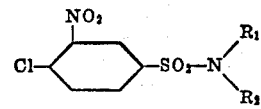

with 1 mol of an amine of the formula

The significances of $R_1$, $R_2$, $R_3$ and $R_4$ are indicated in the appropriate columns. A further column gives the melting point of the final product, and in the end column the shade of the dyestuff on acetate rayon is noted.

| Example No. | $R_1$ | $R_2$ | $R_3$ | $R_4$ | Melting Point, °C. | Shade of Dyeing on Acetate Rayon |
|---|---|---|---|---|---|---|
| 5 | phenyl | H | 2-methylcyclohexyl | H | 147 | greenish yellow. |
| 6 | do | H | 2-(1,2,3,4-tetrahydro)-naphthyl | H | 168 | Do. |
| 7 | do | H | 2-hydroxyethyl | 2-hydroxyethyl | 157 | Do. |
| 8 | do | H | methyl | H | 188 | Do. |
| 9 | do | H | 2-hydroxyethyl | H | 122 | Do. |
| 10 | do | H | 2-methoxyethyl | H | 150 | Do. |
| 11 | do | H | 3-methoxypropyl | H | 118 | Do. |
| 12 | do | H | 3-morpholylpropyl | H | 136 | Do. |
| 13 | do | H | allyl | H | 103 | Do. |
| 14 | do | H | 2-hydroxypropyl | H | 119 | Do. |
| 15 | do | H | n-hexyl | H | 150 | Do. |
| 16 | do | H | n-decyl | H | 85 | Do. |
| 17 | do | H | benzyl | H | 158 | Do. |
| 18 | —CH₂—CH₂—O—CH₂—CH₂— | | 3-methoxypropyl | H | 83 | Do. |
| 19 | —CH₂—CH₂—O—CH₂—CH₂— | | 2-hydroxyethyl | H | 179 | Do. |
| 20 | isopropyl | H | 3-morpholylpropyl | H | 143 | Do. |
| 21 | do | H | cyclohexyl | H | 156 | Do. |
| 22 | do | H | benzyl | H | 148 | Do. |
| 23 | 4-[2'-(2''-methoxy)-ethoxy]-ethoxyphenyl | H | 3-methoxypropyl | H | 128 | Do. |
| 24 | 2-hydroxyethyl | 2-hydroxyethyl | 3-morpholylpropyl | H | 165 | Do. |
| 25 | do | do | benzyl | H | 135 | Do. |
| 26 | 4-[2'-(2''-methoxy)-ethoxy]-ethoxyphenyl | H | cyclohexyl | H | 119 | Do. |
| 27 | cyclohexyl | H | 2-hydroxyethyl | H | 142 | Do. |
| 28 | do | H | 3-methoxypropyl | H | 115 | Do. |
| 29 | benzyl | H | 2-hydroxyethyl | H | 99 | Do. |
| 30 | do | H | 3-methoxypropyl | H | 106 | Do. |
| 31 | 2-hydroxyethyl | H | benzyl | H | 152 | Do. |
| 32 | do | H | cyclohexyl | H | 133 | Do. |
| 33 | 3-methoxypropyl | H | benzyl | H | 114 | Do. |
| 34 | do | H | cyclohexyl | H | 116 | Do. |
| 35 | n-hexyl | H | do | H | 126 | Do. |
| 36 | 2-ethylhexyl | H | do | H | 134 | Do. |
| 37 | methyl | methyl | do | H | 168 | Do. |
| 38 | benzyl | H | do | H | 158 | Do. |
| 39 | methyl | 2-hydroxyethyl | do | H | 122 | Do. |
| 40 | phenyl | do | do | H | 127 | Do. |
| 41 | 2-methylphenyl | do | do | H | 105 | Do. |
| 42 | 3-methylphenyl | do | do | H | 118 | Do. |
| 43 | phenyl | H | 2-[2'-(2''-methoxy)-ethoxy]-ethoxyphenyl | H | 131 | reddish yellow. |
| 44 | 2-hydroxyethyl | 2-hydroxyethyl | do | H | 88 | Do. |
| 45 | —CH₂—CH₂—O—CH₂—CH₂— | | 4-[2'-(2''-methoxy)-ethoxy]-ethoxyphenyl | H | 95 | Do. |
| 46 | —CH₂—CH₂—O—CH₂—CH₂— | | 4-{2''-[2''-(2'''-ethoxy)-ethoxy]-ethoxy}-ethoxyphenyl | H | 80 | Do. |
| 47 | phenyl | H | 4-(2'-methoxy)-ethoxyphenyl | H | 169 | Do. |
| 48 | isopropyl | H | 4-[2'-(2''-methoxy)-ethoxy]-ethoxyphenyl | H | 94 | Do. |
| 49 | benzyl | H | do | H | 112 | Do. |
| 50 | cyclohexyl | H | do | H | 95 | Do. |
| 51 | isopropyl | H | 4-(2'-methoxy)-ethoxyphenyl | H | 149 | Do. |
| 52 | 4-(2'-methoxy)-ethoxyphenyl | H | do | H | 123 | Do. |
| 53 | phenyl | H | 4-[2'-(2''-butoxy)-ethoxy]-ethoxyphenyl | H | 88 | Do. |
| 54 | do | H | 3-chloro-4-[2'-(2''-methoxy)-ethoxy]-ethoxyphenyl | H | 138 | Do. |
| 55 | 2-methylphenyl | H | 4-[2'-(2''-methoxy)-ethoxy]-ethoxyphenyl | H | 109 | Do. |
| 56 | 3-methylphenyl | H | do | H | 118 | Do. |
| 57 | 4-methylphenyl | H | do | H | 117 | Do. |
| 58 | 2,5-dichlorophenyl | H | do | H | 163 | Do. |
| 59 | 1 naphthyl | H | do | H | 167 | Do. |
| 60 | 1-(5,6,7,8-tetrahydro)-naphthyl | H | do | H | 134 | Do. |
| 61 | benzyl | H | 4-(2'-hydroxy)-ethoxyphenyl | H | 172 | Do. |
| 62 | cyclohexyl | H | do | H | 147 | Do. |
| 63 | 2-methylphenyl | H | do | H | 143 | Do. |
| 64 | 3-methylphenyl | H | do | H | 138 | Do. |
| 65 | 4-methylphenyl | H | do | H | 165 | Do. |
| 66 | 2,5-dichlorophenyl | H | do | H | 198 | Do. |
| 67 | 1-naphthyl | H | do | H | 178 | Do. |

| Example No. | R₁ | R₂ | R₃ | R₄ | Melting Point, °C. | Shade of Dyeing on Acetate Rayon |
|---|---|---|---|---|---|---|
| 68 | 1-(5,6,7,8-tetrahydro)-naphthyl. | H | 4-(2'-hydroxy)-ethoxy-phenyl. | H | 173 | reddish yellow. |
| 69 | phenyl | 2-hydroxyethyl. | ...do... | H | 74 | Do. |
| 70 | ...do... | H | 4-(2'-hydroxy)-ethylphenyl. | H | 89 | neutral yellow. |
| 71 | cyclohexyl | H | ...do... | H | 159 | Do. |
| 72 | phenyl | H | 4-methyl-3-(2'-hydroxy)-ethoxymethylphenyl. | H | 112 | Do. |
| 73 | cyclohexyl | H | 4-methyl-3-(2'-methoxy)-ethoxymethylphenyl. | H | 114 | Do. |
| 74 | ...do... | H | 4-methyl-3-(2'-hydroxy)-ethoxymethylphenyl. | H | 121 | Do. |
| 75 | ...do... | H | 4-methyl-3-[2'-(2"-methoxy)-ethoxy]-ethoxymethylphenyl. | H | 91 | Do. |
| 76 | phenyl | H | 3-hydroxymethylphenyl | H | 107 | Do. |
| 77 | ...do... | H | ethyl | ethyl | 106 | greenish yellow. |
| 78 | 2-hydroxypropyl | 2-hydroxypropyl. | cyclohexyl | H | 124 | Do. |

The following are formulae of some of the products of the foregoing examples:

*Example 34*

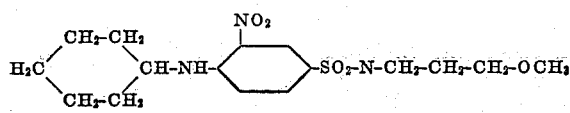

*Example 78*

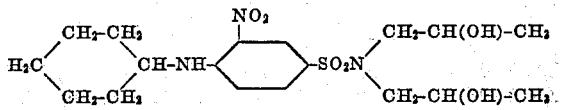

*Example 79*

An intimate mixture of 1 part of the dyestuff of the formula

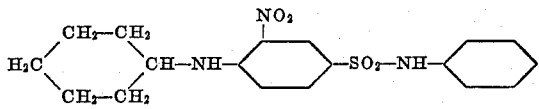

1 part of the dyestuff of the formula

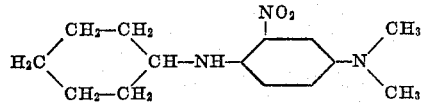

and 1 part of the dyestuff of the formula

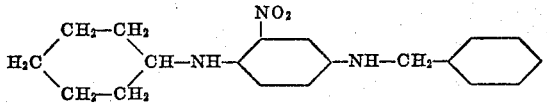

produced according to the process described in Examples 1 to 4, by condensing 3 mols of aminocyclohexane with a mixture of 1 mol of 1-chloro-2-nitrobenzene-4-sulfonic acid phenylamide, 1 mol of 1-chloro-2-nitrobenzene-4-sulfonic acid dimethylamide and 1 mol of 1-chloro-2-nitrobenzene-4-sulfonic acid benzylamide, or by making a paste which may be dried of the three dyestuffs, dyes acetate rayon from aqueous dispersion in fast greenish yellow shades.

Mixtures of the above-mentioned type are of especial value. They often dye acetate rayon in stronger shades than the individual dyestuffs do when the same amount of dyestuff is used. These mixtures, therefore, are of higher money value than the individual dyestuffs.

The mixtures of especial interest are those which contain at least two derivatives of the 1-amino-2-nitrobenzene-4-sulfonic acid amide corresponding to the formula

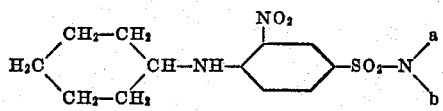

wherein

*a* denotes an aliphatic, cycloaliphatic or araliphatic radical or a radical of the benzene, naphthalene or hydronaphthalene series, and

*b* denotes hydrogen or an aliphatic radical.

*Example 80*

A dyebath is prepared with 0.6 part of the dyestuff obtained according to Example 3 and dispersed with the aid of turkey red oil, 6 parts of a sulfonated fatty alcohol and 3000 parts of water. 100 parts of acetate rayon are entered at room temperature, the bath raised to 80° within 1 hour and maintained at this level for another hour, at which time the dyeing process is completed. On removal the goods are rinsed and dried. To improve the dispersion, the dyestuff can be ground prior to dyeing with suitable wetting, dispersing and emulsifying agents, and preferably in the presence of inorganic salts, e.g. Glauber salt. It can also be intimately mixed in aqueous paste form with a dispersing agent and then converted into powder form by drying at an appropriate temperature.

The present application is a continuation-in-part of application Serial No. 489,771, filed February 21, 1955 (now U.S. Patent No. 2,866,678, patented December 30, 1958).

Having thus disclosed the invention, what is claimed is:

1. The 1-amino-2-nitrobenzene-4-sulfonic acid amide of the formula

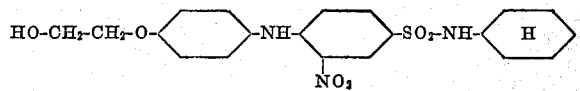

2. The 1-amino-2-nitrobenzene-4-sulfonic acid amide of the formula

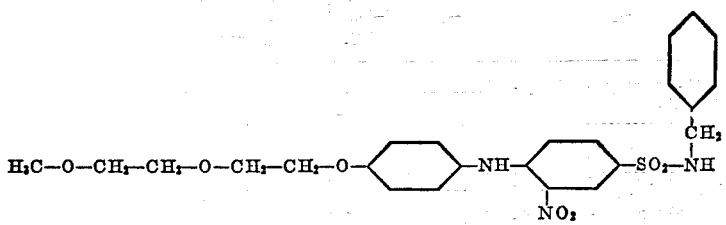

3. The 1-amino-2-nitrobenzene-4-sulfonic acid amide of the formula

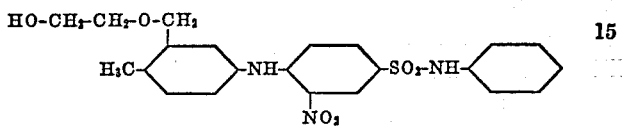

4. The 1-amino-2-nitrobenzene-4-sulfonic acid amide of the formula

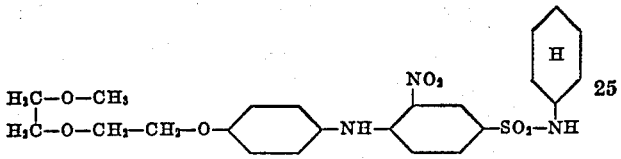

5. The 1-amino-2-nitrobenzene-4-sulfonic acid amide of the formula

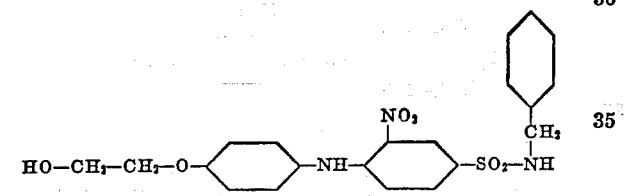

6. The 1-amino-2-nitrobenzene-4-sulfonic acid amide of the formula

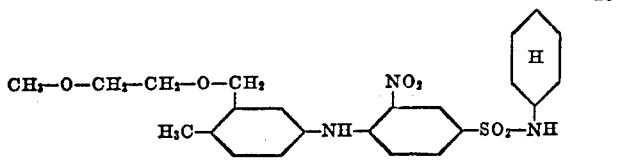

7. The 1-amino-2-nitrobenzene-4-sulfonic acid amide of the formula

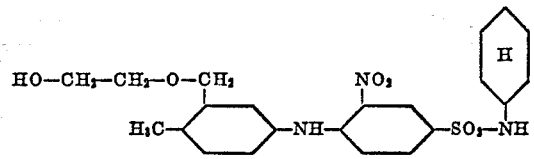

8. The 1-amino-2-nitrobenzene-4-sulfonic acid amide of the formula

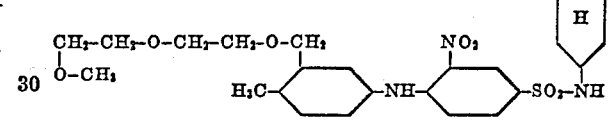

References Cited in the file of this patent
UNITED STATES PATENTS

| | | |
|---|---|---|
| 2,866,678 | Merian | Dec. 30, 1958 |
| 2,922,796 | Adams et al. | Jan. 26, 1960 |

FOREIGN PATENTS

| | | |
|---|---|---|
| 782,759 | Great Britain | Sept. 11, 1957 |